United States Patent Office 3,474,065
Patented Oct. 21, 1969

3,474,065
PHENOLIC RESINS FOR ELASTOMERIC
COMPOSITIONS
John J. Gburek, Amherst, and Frank M. Bryzinsky and Frank S. Grazen, North Tonawanda, N.Y., assignors to Hooker Chemical Corporation, Niagara Falls, N.Y., a corporation of New York
No Drawing. Continuation-in-part of application Ser. No. 238,735, Nov. 19, 1962. This application July 10, 1967, Ser. No. 651,962
Int. Cl. C08d 9/10
U.S. Cl. 260—38
12 Claims

ABSTRACT OF THE DISCLOSURE

Elastomeric compositions comprising (A) from 5 to 75 parts of a novolac resin produced by the reaction of isobutyraldehyde with a phenol, followed by reaction with formaldehyde, and (B) 100 parts of an elastomeric composition.

---

This is a continuation-in-part of Ser. No. 238,735 filed Nov. 19, 1962, now abandoned.

This invention relates to phenolic resins and more particularly to phenolic resins in elastomeric compositions.

Phenolic resins have found use in the preparation of elastomeric compositions. However, the use of these resins has been restricted to applications such as increasing the tack of the uncured elastomeric composition, increasing the hardness of the cured or set elastomeric compositions, and as a component of an adhesive used with ordinary elastomeric compositions. Previous to the present invention the use of phenolic resins was restricted to a very small percentage of the total elastomeric composition if the composition was to remain in an elastic condition after cure. Larger amounts of such phenolic resins do further increase the tensile strength, but only at great sacrifice of the elasticity of the composition.

It has now been found that new compositions of phenolic resins permit a substantial increase in the amount of resin that may be employed in an elastomeric composition to improve tensile strength without reducing elasticity or elongation.

It is an object of this invention to provide new phenolic resins useful in elastomeric compositions. It is a further object of this invention to provide a method for making such new phenolic resins. It is still a further object of this invention to provide useful polymeric and elastomeric compositions incorporating these new phenolic resins. Other objects will also become apparent to those skilled in the art upon reference to the following detailed description and examples.

In accordance with this invention there are provided compositions comprising elastomers and resins which are the condensation product of the higher carbon chain length aldehyde isobutyraldehyde with phenol, followed by reaction of formaldehyde and more phenol.

The elastomers embraced within the scope of this invention are those polymeric materials used in the rubber manufacturing industry and commonly referred to by the class name as "rubber," including both natural and synthetic elastomers. The synthetic elastomers include styrene-butadiene rubber, acrylonitrile-butadiene rubber, polyisoprene, polychloroprene rubber and ethylene-propylene rubber, among others. The mixed-aldehyde novolacs of this invention are useful in most rubbers, but have been most extensively investigated for use in EPR (ethylene-propylene rubber) and EPT (ethylene-propylene terpolymer) rubbers, which are difficult to tackify. A terpolymer is a composition of ethylene, propylene and an unsaturated monomer, such as dicyclopentadiene. Unless otherwise indicated, the term "natural rubber," as used in this application, is understood to mean those elastomers derived from the *Hevea brasiliensis*. The concept of the interchangeability of styrene-butadiene copolymer, natural rubber and polymerized isoprene recognized in the rubber article manufacturing industry, is also recognized in this application.

Generally, to be useful, an elastomer should be modified by the inclusion of other chemicals. In a simple composition, curing agents such as sulfur and zinc oxide are added to the elastomer to produce an unfilled composition which when cured by the application of heat, is useful in a limited number of applications. Additionally, the cure or cross-linking agent may be a free radical curative such as an organic peroxide. Most elastomeric compositions, however, to be useful must be further modified by the inclusion of modifiers such as pigments for color, chemicals to protect the elastomer from degradation, other curatives to alter the curing characteristics of the composition, fillers to impart greater strength or merely to lower the cost of the composition and softeners or plasticizers. Among the fillers which have been used to increase the tensile strength and hardness of the elastomeric composition are carbon black, phenol-formaldehyde resins, clay and metallic oxides.

The typical phenolic resin used in compounding elastomers is based upon the reaction of formaldehyde with an excess of phenol to produce a novolac which thereafter may be oil modified. When added to an elastomeric composition along with sufficient methylene bridge donors and with the application of heat, the phenol resins resinify into hard, permanently set materials which contribute greatly to the stiffness of the elastomeric composition.

It has now been found that by utilizing isobutyraldehyde instead of formaldehyde alone in a phenolic resin reaction, a considerably more flexible, yet equally reinforcing material can be obtained for use in elastomeric compositions. This new novolac resin also permits higher loading of the rubber with extenders, such as clay. Hitherto such use of isobutyraldehyde phenolic resins has not been considered.

The mole concentration of isobutyraldehyde to be employed is determinable from two consideration, namely, the rate at which the resin cures and the amount of isobutyraldehyde required to achieve the desired changes in the physical properties in the rubber composition.

High concentrations of isobutyraldehyde in the phenolic resin mixture will resinify. However, the reaction is sluggish and the resulting resins are slow curing. Low concentrations of isobutyraldehyde are sufficient to produce noticeable changes in the physical properties of the elastomeric compound. Especially successful practical resins may be prepared when the mole percent of isobutyraldehyde is from 20 to 80 percent of the total aldehyde content employed in condensing the phenols, the balance being formaldehyde.

The quantity of the invented resins to be admixed with an elastomeric composition will vary over wide ranges depending upon the exact elastomeric composition properties desired. However, it has been found that as low as 4 phr. and up to 85 phr. (parts per hundred parts of rubber hydrocarbon in the elastomeric composition) of our resin with 80 mole percent isobutyraldehyde may be successfully employed in elastomeric compositions.

From about 4 to about 15 phr. can be used to impart tackifying is between about 5 and about 10 phr., and a fabrication, and up to about 85 phr. may be used to impart high flexibility, allowing high loading of extenders, for such uses as shoe sole stocks. A preferred range for tackifying is between about 5 and about 5 phr., and a preferred range for achieving high flexibility is between about 20 and about 60 phr. Similar advantages may be obtained by varying the mole ratio of isobutyraldehyde with a corresponding adjustment in the total amount of resin employed.

The amount of aldehyde to be condensed with the phenol may be varied to prepare condensates of varying molecular weights and the viscosity of the finished resin may be controlled by regulation of the mole weight thereof. These products are known as novolacs and are deficient in methylene linkages to the extent that they are properly termed linear polymers. As such, novolacs will soften and fuse into a mass with application of heat. Additional methylene linkages are required to cross-link these polymers and make them infusible. Preferably, the amount of aldehyde varies from about 0.5 to about 1.0 mole per mole of the phenol when a mono or difunctional phenol is used, with a range of about 0.7 to about 0.9 being preferred. In instances where a trifunctional phenol is used, the preferred upper limit of aldehyde may be about 0.85 mole per mole of phenol so as to prevent formation of insoluble and infusible condensates. When a resin formation is prepared so that the total aldehyde ratio to phenol is comparable to a Formalin (37.2% formaldehyde content by weight) to phenol ratio of 66.4% by weight, a resin with an average chain length of 5 phenol units results. A typical reaction is illustrated below:

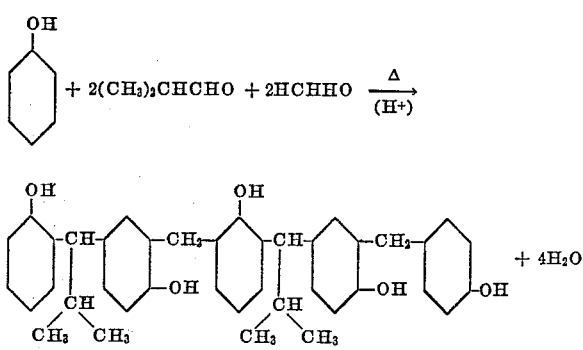

The remaining mole percent of aldehyde to make resins of this invention can be formaldehyde which may be in aqueous solution (Formalin) or in any of its low polymeric forms such as paraformaldehyde or trioxane.

Examples of phenols which may be used in preparing phenol/formaldehyde/isobutyraldehyde condensates for use in practicing the invention include phenol itself or substituted phenols having the following general formula:

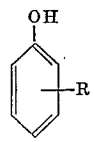

where R may be H, F, Cl, Br or a suitable substituent selected from the following:

(a) Alkyl groups of 1 to 18 carbon atoms in any of their isomeric forms and substituted on the phenolic nucleus in the ortho-, meta- or para-positions;

(b) Alicyclic groups of 5 to 18 carbon atoms such as cyclohexyl, cyclopentyl, methyl, cyclohexyl, butyl-cyclohexyl, etc.;

(c) Aromatic or aralkyl groups of 6 to 18 carbon atoms such as phenyl, alpha-methyl benzyl, benzyl, cumyl, etc.;

(d) Alkyl, alicyclic, aryl and aralkyl ketones wherein the hydrocarbon is defined as hereinbefore.

(e) Alkyl, alicyclic, aryl and aralkyl carboxylic groups wherein the hydrocarbon is as defined hereinbefore.

Suitable substituted phenols include the following:

para-tertiary-butylphenol,
para-secondary-butylphenol,
para-tertiary-amyl phenol,
para-tertiary hexylphenol,
para-isooctyl-phenol,
para-tertiary-nonyl phenol,
para-phenylphenol,
para-benzylphenol,
para-cyclohexylphenol,
para-decyl-phenol,
para-dodecyl-phenol,
para-tetra-decyl-phenol,
para-octa-decyl-phenol,
para-nonyl-phenol,
para-methyl-phenol,
para-beta-naphthyl-phenol,
para-alpha-naphthyl-phenol,
para-pentadecyl-phenol,
para-cetyl-phenol,
para-cumyl phenol,
para-hydroxy acetophenone,
para-hydroxy benzophenone, a phenol alkylated with a terpene, such as limonene, a phenol alkylated with oleic acid, a phenol alkylated with pinenes, such as $\alpha$ and $\beta$-pinene, as well as the corresponding ortho and meta derivatives such as meta-butyl phenol and ortho-butyl phenol, as well as mixtures thereof.

From the foregoing, it is apparent that substantially any phenol may be used in practicing the present invention provided it has a reactive phenolic hydroxyl group capable of directing methylene linkages to produce a condensate. The pure refined phenols may be used, but this is not always necessary. For instance, phenols may be alkylated and then reacted with an aldehyde to produce a crude product which may contain some polyalkylated as well as non-alkylated phenols. Mixtures of phenols mentioned herein also may be used.

The use of isobutyraldehyde in the novolac preparation indicates the employment of strong, concentrated acids as catalyst such as sulfuric or hydrochloric acid. Wetting agents of the anionic type such as sodium alkyl aryl sulfonate are very useful as secondary catalysts.

Among the most practical methods of preparation of the invented compositions is that which involves the addition of the isobutyraldehyde prior to addition of formaldehyde since a concentrated and strong acid is utilized with isobutyraldehyde to promote complete reaction with the phenol. The addition and reaction of formaldehyde prior to the isobutyraldehyde would be less satisfactory and would dilute the catalyst concentration and limit the reflux temperature of the reaction mixture (to about 100 degrees centigrade). Under these conditions, isobutyraldehyde would not usually be fully reacted. Alternatively, it is possible to add and react the formaldehyde, remove the water by distillation, and then add the isobutyraldehyde and react it with the phenolic compound. However, this procedure is much more cumbersome and time consuming.

A preferred thermosettable pre-condensate material is thus prepared by reacting at a temperature between about 25 and about 150 degrees centigrade and a pressure of between zero and about 100 p.s.i.g., a phenol with isobutyraldehyde, followed by reacting the resultant pre-condensate with formaldehyde, the mole ratio of total aldehydes comprising between about 5 and about 100 parts isobutyraldehyde and between about zero and about 95 parts formaldehyde. When resins containing relatively high parts of isobutyraldehyde and very low or zero parts of formaldehyde, they may be useful as antiskinning agents.

A mixture of phenol, catalyst and wetting agent, such as an alkyl aryl sodium sulfonate or other suitable anionic compound of equivalent action is charged to reaction vessel and is heated to 100 degrees centigrade. The isobutyraldehyde is added slowly, allowing the temperature of the mix to rise so that general reflux is obtained. After the isobutyraldehyde is added the mixture is refluxed until the reaction is completed. Thereafter formaldehyde is slowly added to the reaction mixture at 100 degrees centigrade maintaining general reflux conditions throughout the addition and then the reaction mixture is refluxed until completed. Afterward the catalyst may be neutralized and the novolac distilled to the desired endpoint. The reaction may be modified to proceed under temperatures upwards of 150 degrees centigrade at pressures upwards of 100 p.s.i. for a suitable time, e.g., one and one-half hours, until the desired degree of condensation has taken place. Thereafter excess reactant, water, and so forth are removed and the molten resin is discharged from the vessel.

The resin is then ground to desired particle size and the desired amount of methylene link donor material such as hexamethylenetetramine is admixed with it. The basic resin is now ready for use in elastomeric compositions.

The elastomeric composition is prepared by using conventional compounding and mixing equipment of the rubber manufacturing industry. A description of a preparation procedure follows.

The elastomer is physically plasticized, "masticated," or "broken down" by a process which comprises subjecting the elastomer to a severe mechanical shearing stress. Under such conditions the elastomer gradually becomes softer and more readily deformable. Mechanically the change may be produced by a "rubber" mill or an internal mixer, for example, a Banbury mixer.

Acrylonitrile-butadiene is effectively masticated on a rubber mill by milling the elastomer for 5 to 10 minutes on a cool, tight mill. Temperatures up to about 125 degrees Fahrenheit are considered to be satisfactory for masticating. "Tight" is employed in the usual rubber manufacturing sense, that is, the space between mill rolls required to subject the elastomer to severe mechanical shearing stress is small when compared to normal distance employed while mixing the composition. A suitable clearance might be one-eighth of an inch.

When the elastomeric composition is mixed on a mill, the masticated rubber is then banded on the slow roll and the zinc oxide and sulfur are added. Good dispersion is important. Cutting and blending with cuts three-fourths across the roll gives uniform mixing; however, the batch should not be cut when dry pigments are present in the rolling bank. Half of the filling pigment is then added, cut and blended into the batch. The second half may then be added and dispersed. Softeners, waxes, accelerators and organic acid activators, such as stearic acid, are added in that order. The batch is then cut, blended and refined until it is of uniform composition. Time to complete the mixing is based on the time to properly blend in all ingredients and yet not initiate the cross-linking of the composition. Typical mixing temperatures for mill mixing of elastomeric compositions is from 125 to 180 degrees Fahrenheit while temperatures employed by internal mixers may even exceed 275 degrees Fahrenheit.

The compositions of Examples 8 through 47 were prepared using the above described method.

After making the mixtures of described components by a process such as that described, the elastomeric composition is made into useful articles by forming and cross-linking by the application of controlled amounts of heat and pressure, temperatures of 250 to 345 degrees Fahrenheit and pressures of 25 to 1,000 pounds per square inch for 2 to 60 minutes being useful.

Although many formulations of elastomeric compositions within the invention may be made, some typical compositions are shown in Tables 2 through 6. An extensive collection of elastomeric compositions, ingredients and references are contained in The Vanderbilt Rubber Handbook (6th edition), R. T. Vanderbilt Company, New York, N.Y., 1958.

The invention is illustrated by the following examples which are intended to exemplify but not to limit the scope of this invention.

Table I which contains Examples 1 through 7, shows some formulations and properties of the resins of this invention.

Examples 8 through 14 in Table 2 illustrate the effect of resins prepared with isobutyraldehyde in an unfilled acrylonitrile/butadiene copolymer. All elastomeric formulations are expressed in terms of 100 parts of rubber hydrocarbon (phr.). Physical test data was obtained in accordance with ASTM procedures. Outstanding improvement of tensile strength with slight changes in other physical properties is shown by resins of Example 3 (60 mole percent isobutyraldehyde), Example 4 (50 mole percent isobutyraldehyde), and Example 5 (40 mole percent isobutyraldehyde) in Examples 10, 11, and 12 respectively.

Table 3 compares a widely used resin of the rubber article manufacturing industry against that of the present invention. The resin of Example 4 (50 mole percent isobutyraldehyde) was tested at various concentrations (20 to 100 phr.) in the same unfilled acrylonitrile/butadiene formulation of Table 2. An exceptional increase of tensile strength is shown by formulations containing up to 80 parts resins of our invention while the elongation values remain comparable.

Table 4 demonstrates the utility of our invention in hard kaolin clay filled acrylonitrile-butadiene copolymer compositions while Table 5 illustrates use in carbon black filled styrene butadiene copolymer composition.

We have found our invention suitable for use with ethylene propylene copolymers as shown in Table 6.

That the exceptional compatibility of the present resins with elastomeric compositions permits the incorporation of substantially large amounts of resin therein while causing no significant change of stress-strain properties, is of great importance to the rubber products manufacturing industry. Thus, a means has been provided for reducing the amount of elastomer required in a composition, yet with the achievement of comparable results. Moreover, in many cases, for example with an acrylonitrile-butadiene copolymer unfilled compositions, the physical properties are significantly improved.

Various changes and modifications may be made in the method of this invention and the composition ratios of this invention, certain preferred forms of which have herein been described, without departing from the spirit and scope of this invention. These modifications are to be regarded as within the scope and purview of this invention.

TABLE NO. 1.—RESIN FORMATIONS AND PHYSICAL PROPERTIES

|  | Example | | | | | | |
|---|---|---|---|---|---|---|---|
|  | 1 | 2 | 3 | 4 | 5 | 6 | 7 |
| Novolac Formulation (Parts by weight): | | | | | | | |
| Phenol | 100.0 | 100.0 | 100.0 | 100.0 | 100.0 | 100.0 | 100.0 |
| Sulfuric Acid | 1.0 | 1.0 | 1.0 | 1.0 | 1.0 | 1.0 | 1.0 |
| Nacconol NRSF [1] | 0.2 | 0.2 | 0.2 | 0.2 | 0.2 | 0.2 | 0.2 |
| Isobutyraldehyde (IBA) | 57.6 | 51.7 | 34.4 | 28.7 | 23.0 | 5.7 | |
| Formalin (37%) | | 6.5 | 26.0 | 32.5 | 39.0 | 58.6 | 66.4 |
| Mole Percent IBA/CH$_2$O | 100/0 | 90/10 | 60/40 | 50/50 | 40/60 | 10/90 | 0/100 |
| Physical Properties: | | | | | | | |
| Melting Point, Shrink, °C | 65 | 73 | 65 | 76 | 73 | 67 | 73 |
| Melting Point, Clear, °C | 72 | 84 | 79 | 82 | 81 | 77 | 81 |
| I.P. Flow 0.2 gm. mm | 250 | 132 | 140 | 121 | 128 | 152 | 110 |
| I.P. Flow 0.3 gm. mm | | 180 | 186 | 174 | 174 | 231 | 154 |
| Final Resin (Parts by weight): | | | | | | | |
| Novolac | 100.0 | 100.0 | 100.0 | 100.0 | 100.0 | 100.0 | 100.0 |
| Hexamethylene tetramine | 12.0 | 12.0 | 12.0 | 12.0 | 12.0 | 12.0 | 12.0 |
| Physical Properties: | | | | | | | |
| Cure at 150° C., sec | 260-265 | 200-205 | 130-135 | 115-120 | 110-115 | 73-78 | 63-68 |
| Cure at 165° C., sec | 113-115 | 84-86 | 61-63 | 53-54 | 55-57 | 34-36 | 31-33 |
| Melting Point, Shrink, °C | 64 | 71 | 69 | 78 | 73 | 67 | 69 |
| Melting Point, Clear, °C | 76 | 85 | 83 | 88 | 88 | 87 | 89 |
| I.P. Flow, 0.5 gm., mm | 135 | 103 | 92 | 86 | 82 | 76 | 52 |
| pH (20% resin water soln.) | 8.9 | 8.9 | 8.7 | 8.3 | 8.6 | 8.6 | 8.5 |

[1] Alkyl aryl sodium sulfonate wetting agent, National Aniline Div., Allied Chemical Corp.

TABLE NO. 2.—COMPARISON OF ISOBUTYRALDEHYDE/FORMALDEHYDE MOLE RATIO IN UNFILLED ACRYLONITRILE/BUTADIENE PROPOLYMER COMPOSITION

|  | Example | | | | | | |
|---|---|---|---|---|---|---|---|
|  | 8 | 9 | 10 | 11 | 12 | 13 | 14 |
| Mole percent IBA/CH$_2$O | 100/0 | 90/10 | 60/40 | 50/50 | 40/60 | 10/90 | 0/100 |
| Hycar 1001 [1] | 100.0 | 100.0 | 100.0 | 100.0 | 100.0 | 100.0 | 100.0 |
| Stearic Acid | 1.5 | 1.5 | 1.5 | 1.5 | 1.5 | 1.5 | 1.5 |
| Zinc Oxide | 5.0 | 5.0 | 5.0 | 5.0 | 5.0 | 5.0 | 5.0 |
| Resin Example #1 | 50.0 | | | | | | |
| Resin Example #2 | | 50.0 | | | | | |
| Resin Example #3 | | | 50.0 | | | | |
| Resin Example #4 | | | | 50.0 | | | |
| Resin Example #5 | | | | | 50.0 | | |
| Resin Example #6 | | | | | | 50.0 | |
| Resin Example #7 | | | | | | | 50.0 |
| Sulfur | 1.5 | 1.5 | 1.5 | 1.5 | 1.5 | 1.5 | 1.5 |
| Physical Properties, press cure 20' at 300° F.: | | | | | | | |
| Tensile Strength, p.s.i | 2,340 | 2,510 | 3,448 | 3,963 | 3,212 | 2,573 | 1,987 |
| Elongation, percent | 323 | 341 | 413 | 404 | 362 | 363 | 250 |
| Modulus (100% elongation) p.s.i | 301 | 317 | 356 | 391 | 482 | 474 | 687 |
| Tear Resistance, lbs./in | 296 | 312 | 449 | 375 | 413 | 546 | 510 |
| Shore Hardness | A70 | A71 | A77 | A79 | A82 | A87 | A88 |

[1] High Acrylonitrile Content, Acrylonitrile/butadiene Copolymer, Mfgr. B.F. Goodrich Co.

TABLE NO. 3.—COMPARISON OF PHENOLIC RESINS IN UNLOADED NITRILE STOCK

|  | Example | | | | | | | | | | | | |
|---|---|---|---|---|---|---|---|---|---|---|---|---|---|
|  | 15 | 16 | 17 | 18 | 19 | 20 | 21 | 22 | 23 | 24 | 25 | 26 | 27 |
| Hycar 1001 | 100.0 | 100.0 | 100.0 | 100.0 | 100.0 | 100.0 | 100.0 | 100.0 | 100.0 | 100.0 | 100.0 | 100.0 | 100.0 |
| Stearic Acid | 1.5 | 1.5 | 1.5 | 1.5 | 1.5 | 1.5 | 1.5 | 1.5 | 1.5 | 1.5 | 1.5 | 1.5 | 1.5 |
| Zinc Oxide | 5.0 | 5.0 | 5.0 | 5.0 | 5.0 | 5.0 | 5.0 | 5.0 | 5.0 | 5.0 | 5.0 | 5.0 | 5.0 |
| Durez 12687 [1] | 20.0 | | 40.0 | | 50.0 | | 60.0 | | 80.0 | | 100.0 | | |
| Resin Example #4 | | 20.0 | | 40.0 | | 50.0 | | 60.0 | | 80.0 | | 100.0 | |
| Sulfur | 1.5 | 1.5 | 1.5 | 1.5 | 1.5 | 1.5 | 1.5 | 1.5 | 1.5 | 1.5 | 1.5 | 1.5 | 1.5 |
| Press Cured 20' at 300° F.: | | | | | | | | | | | | | |
| Tensile Strength, p.s.i | 1,360 | 1,889 | 1,950 | 3,520 | 2,004 | 3,960 | 2,360 | 3,900 | 2,820 | 2,522 | 3,503 | 1,870 | 929 |
| Elongation, percent | 424 | 507 | 328 | 439 | 280 | 402 | 259 | 360 | 191 | 240 | 124 | 132 | 745 |
| Modulus at 100% E, p.s.i | 381 | 224 | 692 | 349 | 1,052 | 395 | 1,497 | 551 | 2,502 | 652 | 3,200 | 1,254 | 120 |
| Tear Resis., lbs./in | 149 | 335 | 214 | 375 | 323 | 382 | 507 | 338 | 631 | 366 | | 292 | 121 |
| Shore Hardness | A68 | A66 | A84 | A79 | A93 | A77 | [2] D42 | A81 | D57 | A83 | D64 | A88 | A56 |

[1] Two stage phenol formaldehyde resin with hexamethylene tetramine, Hooker Chemical Corp.
[2] Shore "A" Hardness greater than 95, therefore, Shore "D" Hardness must be obtained.

TABLE NO. 4.—A COMPARISON IN CLAY LOADED NITRILE RUBBER STOCK

|  | Example | | | | |
|---|---|---|---|---|---|
|  | 28 | 29 | 30 | 31 | 32 |
| Hycar 1001 | 100.0 | 100.0 | 100.0 | 100.0 | 100.0 |
| Stearic Acid | 1.0 | 1.0 | 1.0 | 1.0 | 1.0 |
| Zinc Oxide | 5.0 | 5.0 | 5.0 | 5.0 | 5.0 |
| Dixie Clay[1] | 100.0 | 100.0 | 100.0 | 100.0 | 100.0 |
| Durez 12687 |  | 20.0 |  | 30.0 |  |
| Resin Example #4 |  |  | 20.0 |  | 30.0 |
| Sulfur | 1.5 | 1.5 | 1.5 | 1.5 | 1.5 |
| Press Cured 20' at 300° F.: | | | | | |
| Tensile Strength, p.s.i. | 2,400 | 2,863 | 3,208 | 3,257 | 2,804 |
| Elongation, percent | 201 | 192 | 199 | 151 | 175 |
| Modulus at 100% E, p.s.i. | 810 | 1,544 | 1,710 | 2,368 | 1,468 |
| Tear Resistance, lbs./in. | 359 | 404 | 430 | 429 | 374 |
| Shore Hardness | A81 | A85 | A89 | A91 | A92 |

[1] Hard Kaolin Clay, R. T. Vanderbilt Co.

TABLE NO. 5.—A COMPARISON OF PHENOLIC RESINS IN CARBON BLACK LOADED STYRENE-BUTADIENE RUBBER STOCK

|  | Example | | | | | | |
|---|---|---|---|---|---|---|---|
|  | 33 | 34 | 35 | 36 | 37 | 38 | 39 |
| SBR 1500 | 100.0 | 100.0 | 100.0 | 100.0 | 100.0 | 100.0 | 100.0 |
| HAF Black | 50.0 | 50.0 | 50.0 | 50.0 | 50.0 | 50.0 | 50.0 |
| Stearic Acid | 1.5 | 1.5 | 1.5 | 1.5 | 1.5 | 1.5 | 1.5 |
| Zinc Oxide | 5.0 | 5.0 | 5.0 | 5.0 | 5.0 | 5.0 | 5.0 |
| Durez 13355 [1] |  | 5.0 |  | 10.0 |  | 20.0 |  |
| Resin Example #4 |  |  | 5.0 |  | 10.0 |  | 20.0 |
| Altax [2] | 1.75 | 1.75 | 1.75 | 1.75 | 1.75 | 1.75 | 1.75 |
| Sulfur | 2.0 | 2.0 | 2.0 | 2.0 | 2.0 | 2.0 | 2.0 |
| Press Cured 30' at 300° F.: | | | | | | | |
| Tensile Strength, p.s.i. | 3,265 | 3,300 | 3,345 | 3,035 | 3,157 | 2,505 | 2,510 |
| Elongation, percent | 430 | 371 | 352 | 336 | 307 | 277 | 289 |
| Modulus at 100% E, p.s.i. | 331 | 441 | 510 | 552 | 749 | 683 | 898 |
| Tear Resistance | 345 | 313 | 380 | 306 | 368 | 287 | 340 |
| Shore Hardness | A68 | A72 | A75 | A76 | A80 | A83 | A85 |

[1] Two stage phenol formaldehyde resin, Hooker Chemical Corp.
[2] Benzothiazyl Disulfide. R. T. Vanderbilt Co.

TABLE NO. 6.—A COMPARISON OF PHENOLIC RESINS AS REINFORCING AGENTS IN HI-SIL FILLED ETHYLENE-PROPYLENE RUBBER

|  | Example | | | | | | | |
|---|---|---|---|---|---|---|---|---|
|  | 40 | 41 | 42 | 43 | 44 | 45 | 46 | 47 |
| EPR 404 [1] | 100.0 | 100.0 | 100.0 | 100.0 | 100.0 | 100.0 | 100.0 | 100.0 |
| Hi-Sil 233 [2] | 60.0 | 60.0 | 60.0 | 60.0 | 60.0 | 60.0 | 60.0 | 60.0 |
| Zinc Oxide | 5.0 | 5.0 | 5.0 | 5.0 | 5.0 | 5.0 | 5.0 | 5.0 |
| Durez 12687 |  | 5.0 | 10.0 | 20.0 |  |  |  |  |
| Durez 13355 |  |  |  |  | 20.0 |  |  |  |
| Resin Example #4 |  |  |  |  |  | 5.0 | 10.0 | 20.0 |
| Di-Cup | 2.7 | 2.7 | 2.7 | 2.7 | 2.7 | 2.7 | 2.7 | 2.7 |
| Sulfur | 0.32 | 0.32 | 0.32 | 0.32 | 0.32 | 0.32 | 0.32 | 0.32 |
| Press Cured 40' at 300° F.: | | | | | | | | |
| Tensile Strength, p.s.i. | 1,532 | 2,205 | 2,203 | 1,878 | 1,830 | 2,012 | 2,218 | 1,837 |
| Elongation, percent | 712 | 646 | 703 | 605 | 696 | 625 | 702 | 667 |
| Modulus at 100% E, p.s.i. | 217 | 361 | 344 | 332 | 289 | 391 | 347 | 377 |
| Tear Resis., lbs./in. | 424 | 364 | 344 | 332 | 289 | 326 | 354 | 314 |
| Shore Hardness | A80 | A89 | A88 | A91 | A80 | A91 | A90 | A90 |

[1] Ethylene-Propylene copolymer, Enjay Chem. Div. of Humble Oil Corp.
[2] Precipitated Hydrated Silica, Pittsburgh Plate Glass Co.

What is claimed is:

1. A composition of matter comprising (A) from 5 to 75 parts of a novolac resin containing the reaction product of (1) isobutyraldehyde, (2) formaldehyde and (3) a phenol having the formula:

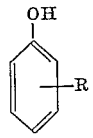

wherein R is H, F, Cl, Br, alkyl group of 1 to 18 carbon atoms, alicyclic groups of 5 to 18 carbon atoms, aromatic groups of 6 to 18 carbon atoms, aralkyl groups of 6 to 18 carbon atoms, alkyl ketones of 1 to 18 carbon atoms, alicyclic ketones of 5 to 18 carbon atoms, aryl ketones of 6 to 18 carbon atoms, aralkyl ketones of 6 to 18 carbon atoms, alkyl carboxylic groups of 1 to 18 carbon atoms, alicyclic carboxylic groups of 5 to 18 carbon atoms, aryl carboxylic groups of 6 to 18 carbon atoms, aralkyl carboxylic groups of 6 to 18 carbon atoms, and mixtures thereof, wherein the mole ratio of total aldehydes is between about 5 and about 100 parts of isobutyraldehyde and between about zero and about 95 parts formaldehyde and wherein the mole ratio of total aldehydes to phenol is between about 0.5 and about 1.0, in combination with (B) an elastomeric composition containing 100 parts of elastomer.

2. A composition of matter comprising (A) from 5 to 75 parts of a novolac resin continuing the reaction product of (1) isobutyraldehyde, (2) formaldehyde and (3) a phenol having the formula:

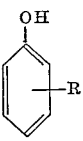

wherein R is H, F, Cl, Br, alkyl group of 1 to 18 carbon atoms, alkyl carboxylic groups of 1 to 18 carbon atoms, groups of 6 to 18 carbon atoms, aralkyl groups of 6 to 18 carbon atoms, alkyl ketones of 1 to 18 carbon atoms, alicyclic ketones of 5 to 18 carbon atoms, aryl ketones of 6 to 18 carbon atoms, aralkyl ketones of 6 to 18 carbon atoms, alkyl carboxylic groups of 1 to 18 carbon atoms, alicyclic carboxylic groups of 5 to 18 carbon atoms, aryl carboxylic groups of 6 to 18 carbon atoms, aralkyl carboxylic groups of 6 to 18 carbon atoms, and mixtures thereof, wherein the mole ratio of total aldehydes is between about 5 and about 100 parts of isobutyraldehyde and between about zero and about 95 parts formaldehyde and wherein the mole ratio of total aldehydes to phenol is between about 0.5 and about 1.0; in combination with (B) an elastomeric composition containing 100 parts of elastomer, the resin having been incorporated into the elastomeric composition while the resin was in a fusible state.

3. The composition according to claim 2 wherein the elastomer is a copolymer of acrylonitrile and butadiene-1,3.

4. The composition according to claim 2 wherein the elastomer is a copolymer of ethylene and propylene.

5. The composition according to claim 2 wherein the elastomer is a copolymer of styrene and butadiene-1,3.

6. The composition according to claim 2 wherein between 7 and 17 percent of the weight of the resin is hexamethylenetetramine.

7. A sulfur-containing cured composition according to claim 3; said composition being characterized by an ultimate elongation of at least 275 percent and a tensile strength in excess of 3000 pounds per square inch.

8. A sulfur-containing free radical cured composition of matter comprising (A) from 5 to 15 parts of a novolac resin containing the reaction product of (1) isobutyraldehyde, (2) formaldehyde and (3) a phenol having the formula

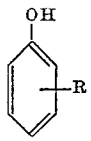

wherein R is H, F, Cl, Br, alkyl group of 1 to 18 carbon atoms, alicyclic groups of 5 to 18 carbon atoms, aromatic groups of 6 to 18 carbon atoms, aralkyl groups of 6 to 18 carbon atoms, alkyl ketones of 1 to 18 carbon atoms, alicyclic ketones of 5 to 18 carbon atoms, aryl ketones of 6 to 18 carbon atoms, aralkyl ketones of 6 to 18 carbon atoms, alkyl carboxylic groups of 1 to 18 carbon atoms, alicyclic carboxylic groups of 5 to 18 carbon atoms, aryl carboxylic groups of 6 to 18 carbon atoms, aralkyl carboxylic groups of 6 to 18 carbon atoms, and mixtures thereof wherein the mole ratio of total aldehydes is between about 5 and about 100 parts of isobutyraldehyde and between about zero and about 95 parts formaldehyde and wherein the mole ratio of total aldehydes to phenol is between about 0.5 and about 1.0, in combination with (B) a composition containing 100 parts of ethylene propylene copolymer and filled with hydrated silica, the resin having been incorporated into the elastomeric composition while the resin was in a fusible state; said composition being characterized by an ultimate elongation of at least 250 to 350 percent and a tensile strength of 1500 to 2500 pounds per square inch.

9. A sulfur-containing cured composition of matter comprising from 5 to 20 parts of a novolac resin containing the reaction product of (1) isobutyraldehyde, (2) formaldehyde and (3) a phenol having the formula

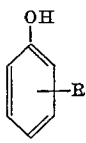

wherein R is H, F, Cl, Br, alkyl group of 1 to 18 carbon atoms, alicyclic groups of 5 to 18 carbon atoms, aromatic groups of 6 to 18 carbon atoms, aralkyl groups of 6 to 18 carbon atoms, alkyl ketones of 1 to 18 carbon atoms, alicyclic ketones of 5 to 18 carbon atoms, aryl ketones of 6 to 18 carbon atoms, aralkyl ketones of 6 to 18 carbon atoms, alkyl carboxylic groups of 1 to 18 carbon atoms, alicyclic carboxylic groups of 5 to 18 carbon atoms, aryl carboxylic groups of 6 to 18 carbon atoms, aralkyl carboxylic groups of 6 to 18 carbon atoms, and mixtures thereof wherein the mole ratio of total aldehydes is between about 5 and about 100 parts of isobutyraldehyde and between about zero and about 95 parts formaldehyde and wherein the mole ratio of total aldehydes to phenol is between about 0.5 and about 1.0, in combination with (B) a composition containing 100 parts of styrene butadiene copolymer and filled with carbon black; the resin having been incorporated into the elastomeric composition while the resin was in a fusible state; said composition being characterized by an ultimate elongation of at least 275 to 375 percent and a tensile strength of 2500 to 3500 pounds per square inch.

10. A method comprising (A) mixing at a temperature between about 125 and 275 degrees Fahrenheit (1) 1 to 75 parts of a reactive fusible resin containing the reaction product of (a) isobutyraldehyde, (b) formaldehyde and (c) a phenol having the formula:

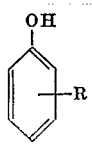

wherein R is H, F, Cl, Br, alkyl group of 1 to 18 carbon atoms, alicyclic carboxylic groups of 5 to 18 carbon groups of 6 to 18 carbon atoms, aralkyl groups of 6 to 18 carbon atoms, alkyl ketones of 1 to 18 carbon atoms, alicyclic ketones of 5 to 18 carbon atoms, aryl ketones of 6 to 18 carbon atoms, aralkyl ketones of 6 to 18 carbon atoms, alkyl carboxylic groups of 1 to 18 carbon atoms, alicyclic carboxylic groups of 5 to 18 carbon atoms, aryl carboxylic groups of 6 to 18 carbon atoms, aralkyl carboxylic groups of 6 to 18 carbon atoms, and mixtures thereof, wherein the mole ratio of total aldehydes is between about 5 and about 100 parts of isobutyraldehyde and between about zero and about 95 parts formaldehyde and wherein the mole ratio of total aldehydes to phenol is between about 0.5 and about 1.0, (2) an elastomeric composition containing 100 parts of elastomer and (B) curing the resulting mixture in the presence of hexamethylene tetramine at a temperature between about 250 and 345 degrees Fahrenheit.

11. The method according to claim 10 wherein the elastomer is a copolymer of acrylonitrile and butadiene-1,3.

12. The method according to claim 10 wherein the elastomer is a copolymer of styrene and butadiene-1,3.

References Cited

UNITED STATES PATENTS

| | | | |
|---|---|---|---|
| 2,459,739 | 1/1949 | Groten | 260—845 |
| 2,916,471 | 12/1959 | Rosahl | 260—845 |
| 3,066,060 | 11/1962 | Gross | 260—846 |
| 2,485,097 | 10/1949 | Howland | 260—845 |
| 2,270,959 | 1/1942 | Murke | 260—845 |
| 2,898,321 | 8/1959 | Shepard | 260—845 |

OTHER REFERENCES

C&E News, Nov. 25, 1963, p. 39.
Chemical Week, Dec. 14, 1963, p. 83.

MORRIS LIEBMAN, Primary Examiner

P. R. MICHL, Assistant Examiner

U.S. Cl. X.R.

260—55, 57, 845, 846

PO-1050
(5/69)

UNITED STATES PATENT OFFICE
CERTIFICATE OF CORRECTION

Patent No. 3,474,065          Dated October 21, 1969

Inventor(s)  John J. Gburek and Frank M. Bryzinsky and Frank S. Grazen

It is certified that error appears in the above-identified patent and that said Letters Patent are hereby corrected as shown below:

Column 3, line 18, "is between about 5 and about 10 phr., and a" should read ---properties in the rubber for such uses as tire----. Column 3, line 22, "5" (second occurrence) should read ---10---. Column 3, line 55, the formula should read as follows:

Column 8, line 40, Table No. 2 Title, "PROPOLYMER" should read---COPOLYMER---
Column 10, line 15, Claim 2, the word "continuing" should read ---containing-
Column 10, line 70, "alkyl carboxylic groups of 1 to 18 carbon atoms," should read ---alicyclic groups of 5 to 18 carbon atoms, aromatic----. Column 12, line 31, "carboxylic" should be omitted. Column 12, line 32, "atoms, aromati should be added to the beginning of the line.

SIGNED AND
SEALED
JUN 9 1970

(SEAL)
Attest:

Edward M. Fletcher, Jr.
Attesting Officer

WILLIAM E. SCHUYLER, JR.
Commissioner of Patents